April 12, 1938.                C. H. AUGER                2,114,168
                              BUTTERFLY VALVE
                           Filed Nov. 14, 1936
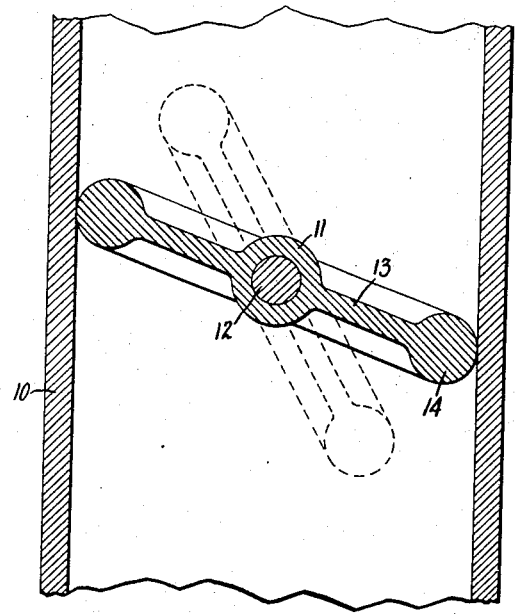
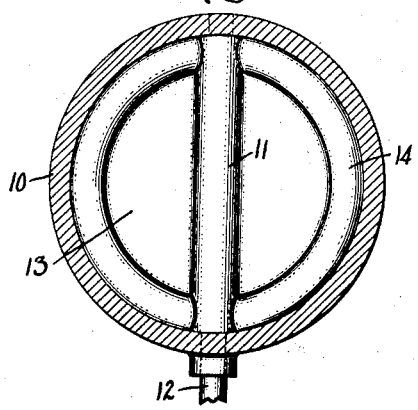
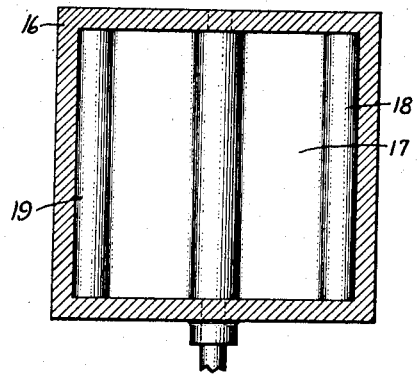
Inventor:
Claude H. Auger,
by Harry E. Dunham
His Attorney.

Patented Apr. 12, 1938

2,114,168

UNITED STATES PATENT OFFICE 2,114,168

BUTTERFLY VALVE

Claude H. Auger, Saugus, Mass., assignor to General Electric Company, a corporation of New York Application November 14, 1936, Serial No. 110,901

3 Claims. (Cl. 251—11)

The present invention relates to butterfly valves for controlling the flow of fluid through a conduit of the type disclosed in the copending application of Sanford A. Moss, Serial No. 76,436, filed April 25, 1936, now Patent No. 2,095,263, granted Oct. 12, 1937, and assigned to the same assignee as this application. The normal type of butterfly valves, as pointed out in the aforementioned application, is unbalanced when near closing position due to the different collector and diffuser angles formed by the edges and the surfaces of the valves with the conduit walls. Such unbalance causes a tendency of the valve to close when near closing position and renders it difficult accurately to control the flow of fluid.

The object of my invention is to provide an improved butterfly valve construction whereby the valve is substantially balanced within a wide range near its closing position. This is accomplished in accordance with my invention by providing the valve with an outer edge rounded or nearly rounded in cross section.

In a preferred embodiment of my invention I provide a valve plate consisting of a disk with a toroidal member or ring secured to or integrally formed with the outer edge of the disk.

For a better understanding of what I believe to be novel and my invention, attention is directed to the following description and the claims appended thereto in connection with the accompanying drawing.

In the drawing Fig. 1 is a sectional view of a butterfly valve arrangement embodying my invention; Fig. 2 is a top view of Fig. 1 to reduced scale; and Fig. 3 is a top view of a modification of my invention.

The arrangement of Figs. 1 and 2 comprises a conduit 10 and a butterfly valve 11 disposed within the conduit for controlling the flow of fluid therethrough. The butterfly valve is attached to a shaft 12 which in turn is supported in known manner by the conduit wall. The valve has a plate with a disk 13 and a toroidal member 14 integrally united with the outer edge of the disk 13. The valve is shown in part open position in dotted lines. The rounded outer edge of the valve plate which in the present instance is formed by the toroidal member 14 defines, within a wide range of movement near the closing position, collector and diffuser angles which are equal on opposite sides of the valve.

The arrangement just described includes a butterfly valve which has a round or nearly round valve plate. Fig. 3 shows a conduit 16 rectangular in cross section with a rectangular butterfly valve 17. This butterfly valve in accordance with my invention has rounded rim portions 18 and 19 on opposite sides. With these rounded rim or edge portions the collector and diffuser angles formed within a wide range of valve movement are equal on opposite sides so that the collector effect on one side of the valve plate balances the collector effect on the other side and likewise, the diffuser effect on one side of the valve plate balances the diffuser effect on the other side.

What I claim as new and desire to secure by Letters Patent of the United States, is,—

1. A butterfly valve for controlling the flow of fluid through a conduit, the valve including a plate with an outer edge circular in cross section, said outer edge being thicker than the thickness of the plate.

2. A butterfly valve for controlling the flow of fluid through a conduit, the valve having a plate comprising a disk and a toroidal member secured to the outer edge of the disk, said member being circular in cross section.

3. A butterfly valve for controlling the flow of fluid through a conduit, the valve having a plate with outer edge portions circular in cross section so that said edge portions define equal collector and diffuser angles on opposite sides of the valve plate within a wide range of valve movement.

CLAUDE H. AUGER.